July 10, 1923.
A. B. BROWNE
FRICTION CLUTCH
Original Filed Oct. 16, 1920    2 Sheets—Sheet 1
1,461,573
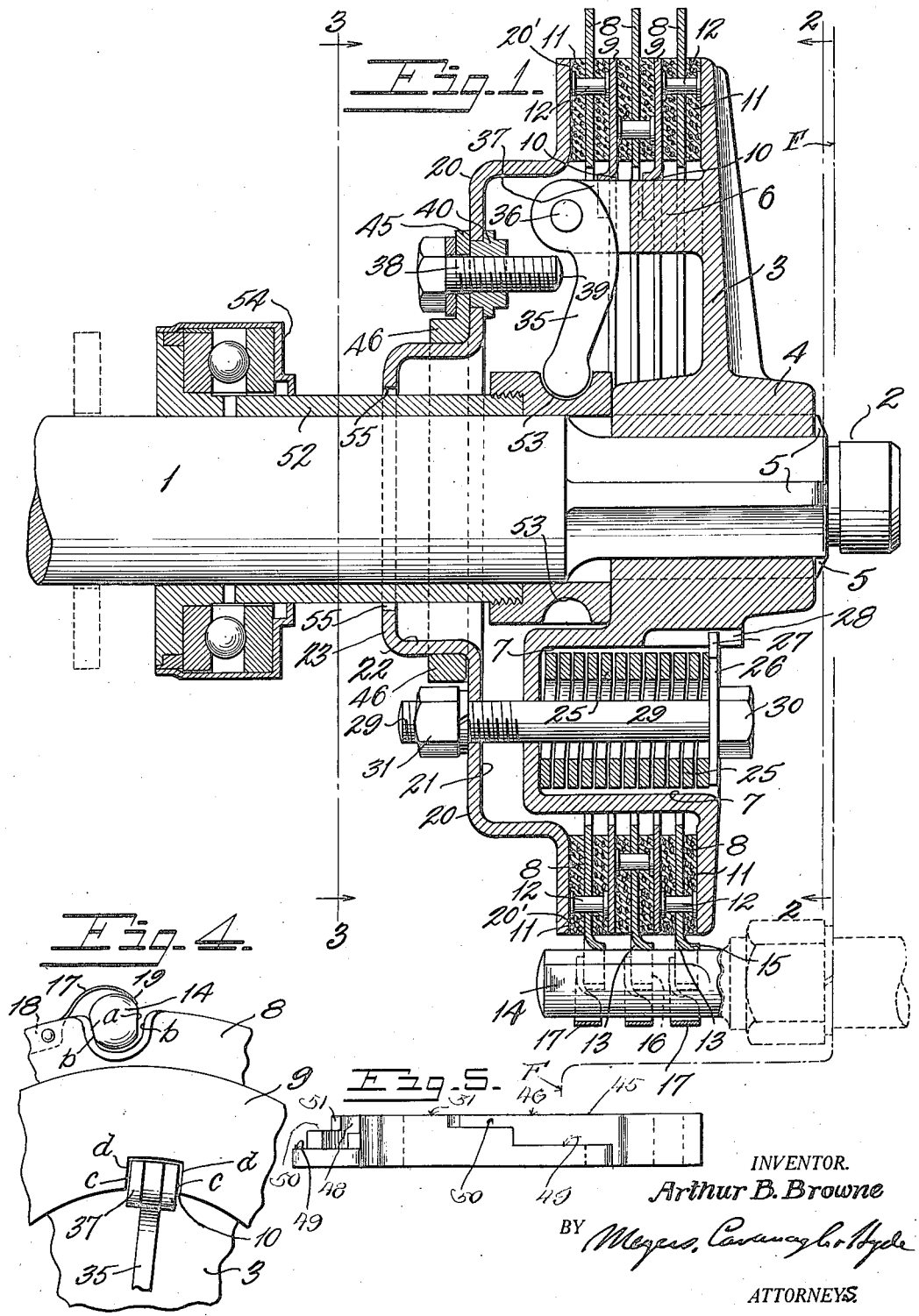
INVENTOR.
Arthur B. Browne
BY Meyers, Cavanagh & Hyde
ATTORNEYS July 10, 1923.
A. B. BROWNE
FRICTION CLUTCH
Original Filed Oct. 16, 1920  2 Sheets-Sheet 2
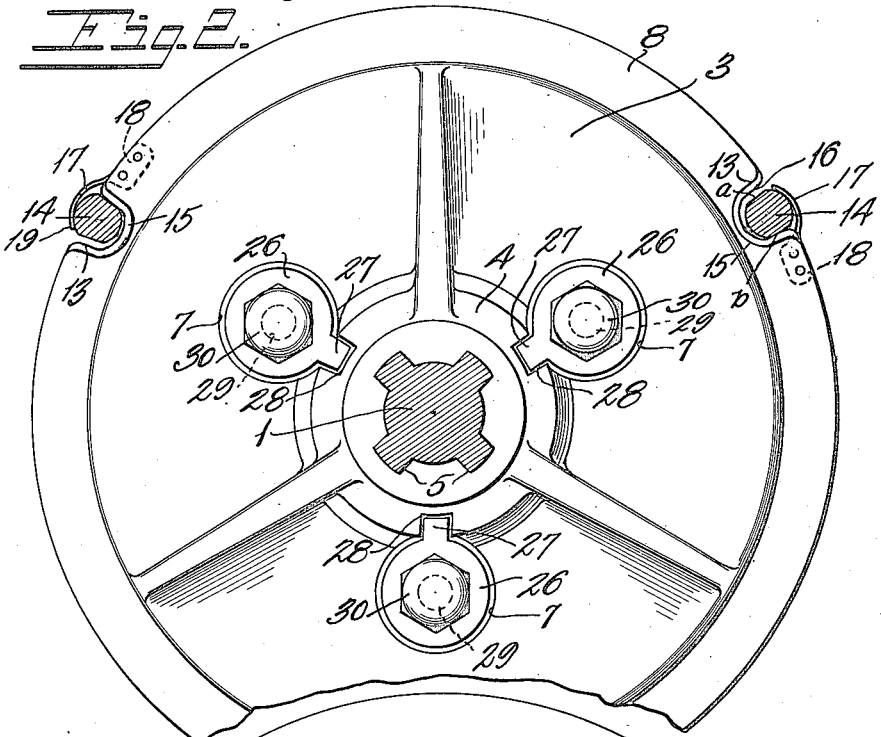
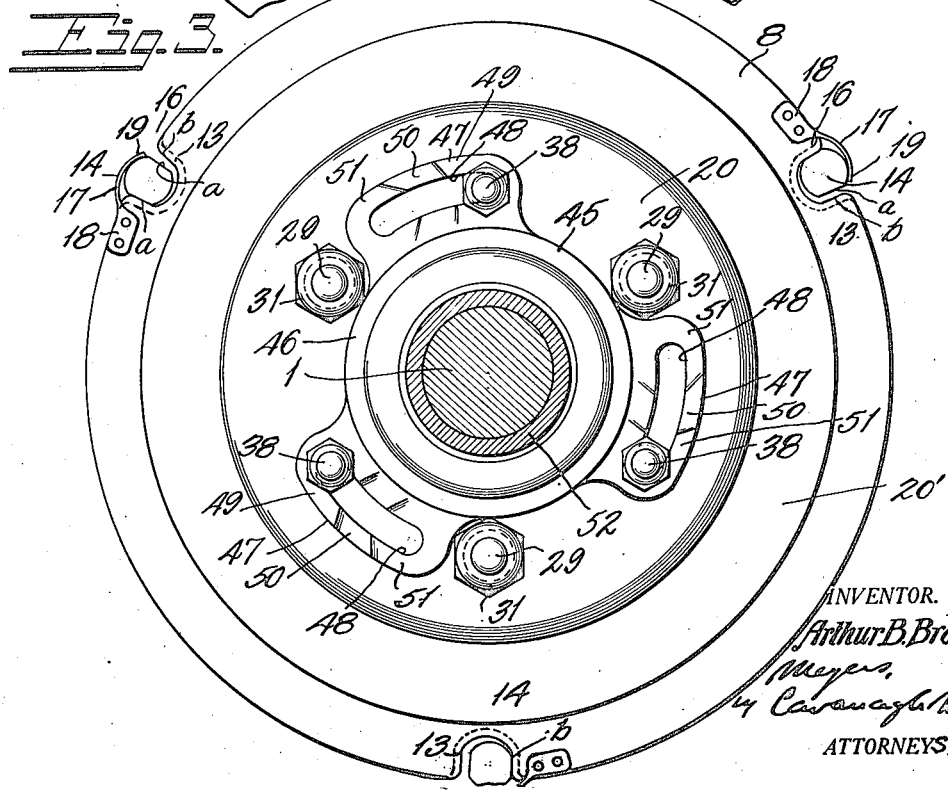
INVENTOR.
Arthur B. Browne
ATTORNEYS.

Patented July 10, 1923.

1,461,573

UNITED STATES PATENT OFFICE.

ARTHUR B. BROWNE, OF DETROIT, MICHIGAN; ANNA H. BROWNE, EXECUTRIX OF SAID ARTHUR B. BROWNE, DECEASED.

FRICTION CLUTCH.

Application filed October 16, 1920, Serial No. 417,351. Renewed September 14, 1922. Serial No. 588,289.

*To all whom it may concern:*

Be it known that I, ARTHUR B. BROWNE, a citizen of the United States, and resident of Detroit, in the county of Wayne and State of Michigan, have invented certain new and useful Improvements in Friction Clutches, of which the following is a specification.

This invention relates to friction clutches, especially valuable for use in motor vehicles and other applications where the conditions require clutches having similar structural and operative features.

The general object of the invention is to provide a clutch employing direct acting springs and so to avoid certain disadvantages of clutches in which the springs act through multiplying devices, such as levers and wedges; and to provide power-multiplying releasing means embodied in the clutch structure proper, and independent of the springs or clutch engaging means, and so to enable ample clutch pressure to be provided by direct acting springs to give the necessary torque capacity without requiring an undesirably great force to be applied to release the clutch; to avoid the necessity for any power multiplying releasing mechanism outside of the clutch structure proper; and to avoid disadvantages inherent in clutches where the releasing means are combined with or dependent on the action of the springs or clutch engaging means.

Another object is to provide improvements in certain details as sufficiently explained hereafter.

In automobile clutch design the length, leverage ratio, and amount of movement of the releasing lever (usually a foot lever) and the amount of manual force to be applied to the foot pad of the lever to release the clutch, are determined within certain limits. It has been found difficult, in connection with these limiting factors to provide clutch spring pressure sufficient to give necessary torque capacity in the clutch without providing additional leverage multiplying devices either within the clutch structure or between the pedal lever and the shiftable member of the clutch. When the additional leverage mechanism is incorporated in the clutch structure it is usually arranged between the spring and the friction surfaces so as to multiply the spring effect, and in this case, wear of the friction surfaces rapidly reduces the effective spring pressure owing to elongation of the springs (which is multiplied through the leverage), and involves other disadvantages. When additional leverage is introduced between the main pedal lever and the shiftable member of the clutch, the clutch casing or other parts adjacent to the clutch must be especially designed, and this prevents the clutch from being readily adapted as an operative unit to various designs of motor vehicles.

The accompanying drawing shows one exemplifying embodiment of my invention. It consists in a structure which avoids the difficulties and realizes the objects above mentioned and also embodies other improvements sufficiently explained in the detailed description. After considering this representative embodiment, persons skilled in the art will understand that many variations in structure may be made within the principles of the invention, and I do not limit myself in structural adaptations beyond the limitations expressed in the claims.

In the drawing:

Fig. 1 is a section in the plane of the clutch shaft axis;

Fig. 2 is a transverse section on line 2—2, Fig. 1;

Fig. 3 is a vertical section on line 3—3, Fig. 1; and Fig. 4 is a fragmentary detail.

Fig. 5 is a detail edge view of the adjustment ring.

The dot and dash line F, Fig. 1, indicates the rear sectional outline of a typical motor vehicle engine fly wheel. The clutch is desirably adapted for direct association with the engine, but may be easily adapted for other locations when desired. Clutch shaft 1, when adapted for direct association with the engine, is provided with a suitable bearing at 2 to support the front end of the shaft revolubly in the fly wheel or the rear end of the engine crank shaft. The rear end of the clutch shaft is supported in a suitable bearing (not shown) or is connected to the driving shaft of transmission gearing, or in some cases itself constitutes the driving shaft of transmission gearing. A plate 3, which is usually called, in the motor vehicle art, a driving plate, but may be designated herein as a main clutch plate, to avoid confusion as to its driving or driven relation to other members, is provided with a hub 4, mounted on shaft 1 and conveniently secured against relative rotation by the provision of splines 5 on the shaft engaging channels in the hub.

The main plate is provided with inwardly projecting lugs 6, usually three in number, spaced equally about the shaft. The main plate also has spring pockets 7, usually corresponding in number to lugs 6 and arranged midway between the lugs. Driving disks 8 are arranged alternately with driven disks 9. The driven disks have sockets 10 engaging lugs 6 to connect the disks rotatively with the main plate 3 and this engagement is sufficiently free to permit the plates to move axially when the clutch is disengaged. Either the driving or the driven plates, but more conveniently the driving plates are provided with facings of suitable friction material 11, secured by rivets 12, as usual. The clutch facings are not essential, since the metal surfaces may engage directly, if desired. The driving disks have sockets 13, usually three or more on each disk, spaced equally about the periphery. These sockets cooperate with driving pins 14 bolted to the fly wheel F, or other initial driving member of the clutch. The sockets are usually reinforced and given added wearing surface by shaping the metal of the plates to provide flanges 15 which form the walls of the sockets. The sides 16 of the sockets extend outward beyond the centers of the driving pins to insure proper driving contact. The sockets are wide enough (in the direction of rotation) to provide moderate clearance between the socket sides and the driving pins to permit the driving plates to move freely axially when the clutch is disengaged. This lost motion is found to cause rattling or chattering of the plates when the clutch is disengaged, in some cases, and to prevent this, means are provided to take up the lost motion. Such means are exemplified by springs 17 riveted to the plates at 18 and having their free ends 19 engaging the driving pins at a point nearly opposite one wall of the socket so as to pull that wall of the socket against the adjacent side of the pin when the clutch is disengaged and in effect hold all the driving plates snugly against the pins and prevent rattling and the noise caused by it.

A pressure plate 20 is provided, having an outer flat, annular friction surface 20' confronting the rearward drive plate or its friction surface. The pressure plate also preferably is formed with a recess 21 to accommodate the spring pockets and other parts and also preferably is provided near its center with a rearwardly extending cylindrical portion 22, terminating in an inwardly turned flange 23. Springs 25 are located in the spring pockets. One end of each spring bears against the bottom of the pocket and the other end bears against a washer 26 and conveniently the washers may have lugs 27 engaging in slots 28 cut in hub 4 to prevent turning. A bolt 29 passes through each spring and at one end has a head 30 bearing against washer 26 and at the other end has a nut 31 bearing against an outer face of the pressure plate, to urge plates 3 and 20 toward each other, without the intervention of any lever, wedges or other devices for multiplying the spring effect.

Power multiplying clutch releasing means, entirely independent of the springs or spring connections are provided. These means are exemplified in the present embodiment as follows: Releasing levers 35 are provided, usually of a number the same as that of the springs 25 or lugs 6. Each of these levers is pivoted on a pin 36 in a clevis 37 formed in the inner end of one of lugs 6. Confronting each lever near its pivot point is a stud consisting conveniently of a screw 38, the inner end 39 of which is adjacent to a rear face of the lever. These screws are seated in the pressure plate in any convenient way, for instance, by providing bushings 40, suitably fixed or detachably secured to the pressure plate. The screws may be adjusted in an obvious way to regulate the releasing action of the levers and the adjustment may be fixed by lock nuts in an obvious manner; but to provide for equal adjustment of all the screws in a convenient way, an annular adjustment plate 45 is desirably provided. This plate has a hub 46 arranged to rotate about the cylindrical portion 22 of the pressure plate and projecting portions 47 arranged between the ends of spring bolts 29 and their nuts so that the adjustment plate does not conflict with the spring bolts. Each of the projecting portions 47 has a slot 48 embracing the shank of one of screws 38, and the outer face of the adjustment plate at each side of the slot is provided with stepped faces 49, 50, 51, each pair of these faces extending rearwardly in the direction of the shaft axis farther than the next adjacent pair of faces. By the loosening of the screws 38 and rotating the adjustment plate in an appropriate direction and setting up the screws again, an equal adjustment of the screws is quickly and easily secured. The screw adjustment not only provides for regulating the releasing point of the levers, but provides for adjusting the lever action to compensate for wear of the friction surfaces when such adjustment is necessary.

Slidably mounted on shaft 1 is a shifter sleeve 52, having at its inner end an annular groove 53 engaging the inner ends of releasing levers 35 and provided at its outer end with a shifting collar 54, as usual. The inturned flange 23 of the pressure plate surrounds shifter sleeve 52, and usually considerable clearance, as at 55, is provided, to provide for free movement of the pressure plate and even permit moderate tilting of the plate without any objectionable results.

The driving pins 14 and co-operating sockets of the driving disks provide one form of connection between the initial driving member of the clutch and the driving disks, for which other suitable or known connections may be substituted and the described connection between the driven disks and the driving plate or main clutch plate 3 is also a representative arrangement for which other known or suitable arrangements may be substituted.

The entire clutch structure, except driving pins 14, is a self-contained operative unit which may be made in one or more sizes and readily adapted to a standard motor vehicle or other machine design, by simply providing the usual bearing locations and providing for a driving connection between the initial driving member, such as an engine fly wheel, and the clutch driving disks, as for example, by properly locating bolt holes in the web of the fly wheel and securing the driving pins 14 therein.

The springs are direct acting and, therefore, their extension and compression in engaging and disengaging the clutch is reduced to a minimum. This slight deflection of the springs prolongs their life, since spring depreciation is proportional to the amount of deflection. Wear of the clutch surfaces causes only an equivalent extension of the springs when the clutch is engaged; that is the expansion of the springs is merely equal to the amount of wear and not a multiple of it as in the case of springs which act through multiplying levers. The springs, therefore, usually require no adjustment throughout the life of the clutch, since the elongation due to wear is very small in proportion to the total compression given to the spring to produce the desired tension, or in other words the amount of extension due to wear reduces the spring pressure by a very small or negligible degree. When necessary, however, the springs may be adjusted to increase their tension by means of nuts 31 without interfering with the releasing means or its adjustment. The main purpose of providing spring adjustment is convenience in assembly and also to provide for adjusting spring tension to adjust the capacity of a clutch of given size to different vehicles; for instance, the same clutch may have a light spring adjustment for low-powered vehicles and a heavier spring adjustment for high powered vehicles.

The releasing mechanism is entirely independent of the springs. The levers and lever connections including the pivot pins are free from any wear due to spring action while the clutch is engaged and, in fact, the releasing mechanism is entirely idle and free from wear, except during periods of disengagement. The provision of power multiplying releasing means, with the other advantages mentioned, permits desirably heavy spring pressure to be used, and at the same time permits the releasing pressure applied to the pedal pad to be kept within moderate limits. The releasing levers are entirely contained within the clutch structure proper and no special arrangement of releasing linkage or lever mechanism, outside of the clutch structure, is necessary.

There is no necessity for very close adjustment of the releasing device. A single releasing lever or any two of them will act properly to release the clutch, since the pressure plate is sufficiently held in line by the spring bolts, and moderate tilting of the pressure plate is permissible. Therefore, the fulcrum studs need not be adjusted with great accuracy, since considerable inequality in the action of the levers is of no particular consequence.

Evidently the number of driving and driven disks may be varied and in the type of clutch chosen as an exemplification of the invention, only one driving disk is essential. This may be clamped directly between the main plate and the pressure plate, producing what is usually termed a single-plate clutch. The general principles of the invention are applicable to clutches other than the disk type, as will be sufficiently understood by persons skilled in the art.

In addition to the rattling of clutch plates, caused by play between supporting pins and the plate sockets, as previously described, I have found that rattling in the clutch is also caused by transverse enlargement of the sockets 13 by the driving pins 14, the relatively small area of the socket wall in engagement with the curved surface of the usual round pin wearing opposite sides of the socket quite rapidly so that the pin has considerable play along its line of thrust.

I have minimized this cause of rattling by shaping the engaging portions of the pins and sockets so that the engagement will be over a relatively large area, which will correspondingly reduce the rate of wear on the socket. I preferably accomplish this object by providing the pins and sockets with straight flat interengaging faces $a$ and $b$, respectively, substantially transverse to the line of thrust.

A similar advantage is obtained in connection with the driven plates 9, as best indicated in Fig. 4. These plates have sockets 10 engaging lugs 6, as previously described. Fig. 4 shows that these lugs may be conveniently made in substantially rectangular shape, as viewed from the rear, and may thus be provided with approximately radial faces *c* engaging approximately radial faces *d* formed in the plate sockets. Thus liberal engaging surfaces between the plates and the lugs is provided, which materially reduces wear and correspondingly reduces rattling and noise due to wear.

What I claim is:—

1. A clutch comprising a shaft, a main plate irrevolubly mounted thereon, a pressure plate, a driving disk between the plates, direct acting spring means arranged to urge the main plate and pressure plate together to frictionally clamp the disk, and a releasing lever independent of the spring means and pivoted on the main plate and arranged to act on the pressure plate to move the plates apart to release the clutch.

2. A clutch comprising a shaft, a main plate irrevolubly mounted thereon, a pressure plate, a driving disk between the plates, direct acting springs arranged to urge the main plate and pressure plate together to frictionally clamp the disk, and releasing levers independent of the springs and fulcrumed on the main plate and arranged to act on the pressure plate to move the plates apart to release the clutch.

3. A clutch comprising a shaft, a main plate thereon, a pressure plate, a drive disk between the plates, direct acting spring means arranged to urge the main plate and pressure plate together to frictionally clamp the disk, a releasing lever independent of the spring means and arranged operatively between the main plate and pressure plate to move them apart to release the clutch, and means for adjusting the lever action to compensate for wear of the friction surfaces.

4. A clutch comprising a shaft, a main plate thereon, a pressure plate, a driving disk between the plates, direct acting springs arranged to urge the main plate and pressure plate together to frictionally clamp the disk, a releasing lever independent of the springs and arranged operatively between the main plate and pressure plate to move them apart to release the clutch, and means for adjusting the lever action to compensate for wear of the friction surfaces, the lever adjustment being independent of the springs or any spring adjustment.

5. A clutch comprising a shaft, a main plate fixed in respect to rotation thereon, a pressure plate, driving disks and driven disks between the main plate and pressure plate, the driven disks being rotatively connected with the main plate, springs acting directly on the plates to urge them together, and releasing levers independent of the springs and fulcrumed on the main plate and arranged to separate the plates with power multiplying effect.

6. A multiple disk clutch comprising a shaft, a main plate fixed revolubly thereon, a pressure plate, a plurality of driving and driven disks between the plates, the driven disks being connected revolubly with the main plate, springs in annularly spaced arrangement about the shaft axis and exerting direct pressure to urge the plates together, releasing levers independent of the springs and arranged in annular spaced relation about the shaft axis in alternate relation to the springs, a shifter movable on the shaft and connected with the releasing levers and adjustable abutments carried by the pressure plate to regulate the releasing action of the levers.

7. A clutch comprising a shaft, a main plate revolubly fixed thereon and provided with lugs in annular spaced position about the shaft, a pressure plate, driving and driven disks between the plates, the driven disks having a driving connection with said lugs, springs in annularly spaced relation about the shaft axis and having connection with the main and pressure plates to exert direct pressure to urge the plates together, releasing levers pivotally mounted in said lugs, the levers being independent of the springs, adjustable abutment studs for the levers carried by the pressure plate, the ends of the studs forming fulcrum points for the levers, a shifter, and a connection between the shifter and the inner ends of the levers.

8. A clutch comprising a shaft, a main plate revolubly fixed thereon and provided with spring sockets, a pressure plate, driving and driven disks between the plates, the driven disks being connected with the main plate, a compression spring located in each spring socket of the main plate and bearing at one end against the plate, a bolt passing through each spring and having a member engaging the other end of said spring, the other end of the bolt engaging the pressure plate, the spring and bolt arrangement providing direct spring pressure urging the plates together, releasing levers independent of the springs and spring bolts, means for adjusting the releasing action of the levers, a shifter, and a connection between the shifter and the releasing levers.

9. A clutch comprising a shaft, a main plate fixed to rotate therewith, a pressure plate, a driving disk between the plates, direct acting springs urging the plates together, releasing levers in annularly spaced positions about the shaft, the levers being independent of the springs, a shifter connected with the levers, screws engaging the pressure plate and having their inner ends arranged to provide fulcrums for the levers, and a rotatable adjustment plate between the pressure plate and the heads of the fulcrum screws and provided with a set of similar stepped surfaces for each screw.

10. Clutch mechanism adapted to be placed on a driven shaft in association with an engine fly wheel as a driving member, and comprising two driven plates, one of which is adapted to be secured to rotate with the shaft, spring means tending to urge the plates together, a driving disk located between said plates and adapted to be connected to revolve with the fly wheel, a power multiplying releasing lever operatively-intermediate the driven plates, and a shifting sleeve arranged to be mounted about said shaft and connected with the releasing lever.

11. Clutch mechanism adapted to be placed on a driven shaft in association with an engine fly wheel as a driving member, and comprising two driven plates, one of which is adapted to be secured against rotation on the shaft, direct acting spring means tending to urge the plates together, at least one driving disk located between clutch portions of said plates and adapted to be connected to revolve with the fly wheel, a power multiplying releasing lever pivotally mounted on one of the plates and arranged to act upon the other to separate the plates, and a shifting sleeve arranged to be mounted on said shaft and connected with the releasing lever.

12. In clutch mechanism, adapted for location immediately adjacent to an engine fly wheel to connect the engine with a transmission shaft, a clutch unit comprising a main driven plate adapted for irrevoluble connection to said transmission shaft, a pressure plate also arranged as a driven element and cooperating with the main plate, a driving disk arranged between the main and pressure plates and having means for irrevoluble connection to said engine fly wheel, spring means urging the main and pressure plates together, releasing levers acting between the main plate and pressure plate to separate them with power multiplying effect, and a shifter sleeve arranged for mounting on said transmission shaft and connected with the power ends of the releasing levers.

13. In clutch mechanism, adapted for location immediately adjacent to an engine fly wheel to connect the engine with a drive shaft of transmission mechanism, a clutch unit comprising a main driven plate adapted for irrevoluble connection to said transmission shaft, a pressure plate also arranged as a driven element and cooperating with the main plate, driving disks arranged between outward portions of the main and pressure plates and having means for irrevoluble connection to said engine fly wheel, driven disks located between the main and pressure plates and cooperating with the driving disks and irrevolubly connected with the main plate, direct acting springs urging the main and pressure plates together, releasing levers acting between the main plate and pressure plate to separate them with power multiplying effect, and a shifter sleeve arranged for mounting on said transmission shaft and connected with the power ends of the releasing levers.

14. A self contained driven clutch unit adapted for easy emplacement between the engine and transmission gearing of a vehicle, comprising a driven shaft adapted for revoluble mounting at the engine shaft axis, two driven plates, one of which is arranged for irrevoluble connection to said shaft, direct acting springs connected to pull the plates together, at least one friction disk between the peripheral portions of the said driven plates and provided with peripheral members adapted for irrevoluble connection to cooperating driving elements carried by the engine shaft, power multiplying releasing levers located operatively between said driven plates, and a shifter arranged to reciprocate on the shaft and connected with the power ends of the releasing levers.

15. A self contained driven clutch unit adapted for ready location between the engine and transmission gearing of a vehicle, comprising a driven shaft adapted for revoluble mounting at the engine shaft axis, two driven plates, one of which is arranged for irrevoluble connection to said shaft, direct acting springs connected to pull the plates together, driving and driven friction disks between peripheral portions of the said driven plates, the driving disks being provided with peripheral members adapted for irrevoluble connection to cooperating driving elements carried by the engine shaft, and the driven disks being irrevolubly connected to one of said driven plates, power multiplying releasing levers fulcrumed in elements of one of said driven plates and arranged to act upon the other plate to separate the plates, and a shifter arranged to reciprocate on the shaft and connected with the power ends of the releasing levers.

16. In a friction clutch adapted for location between the engine and transmission gearing of a vehicle adjacent to the engine fly wheel, a sub-combination of parts including a main driven plate having its hub arranged for irrevoluble connection to a driven clutch shaft leading to the transmission gearing, said plate also being provided with rearward extensions, a pressure plate substantially at the rear of the sub-combination, a friction disk located between peripheral portions of the main and pressure plates and provided with peripheral conformations to cooperate with driving elements of the engine fly wheel, power multiplying releasing levers pivoted in said main plate extensions and arranged to engage against members of the pressure plate to release the clutch, a shifter adapted for mounting on said shaft and arranged to pass through an aperture of the pressure plate and connected to the power ends of the levers, and spring means urging the main and pressure plates toward each other.

17. In a friction clutch adapted for location between the engine and transmission gearing of a vehicle adjacent to the engine fly wheel, a sub-combination of parts including a main driven plate having its hub arranged for irrevoluble connection to a driven clutch shaft leading to the transmission gearing, said plate also being provided with rearward extensions, a pressure plate forming substantially a rear housing for the sub-combination, driving friction disks located between peripheral portions of the main and pressure plates and provided with peripheral conformations to cooperate with driving elements located on the engine fly wheel, driven friction disks cooperating with the driving disks and having inner peripheral conformations engaging said main plate extensions, power multiplying releasing levers pivoted in said projections and substantially enclosed between the main plate and the pressure plate, the levers being arranged to engage against members of the pressure plate to release the clutch, a shifter adapted for mounting on said shaft and arranged to pass through an aperture of the pressure plate and connected to the power ends of the levers, and direct acting spring means urging the main and pressure plates toward each other.

18. In a friction clutch adapted for location between the engine and transmission gearing of a vehicle adjacent to the engine fly wheel, a sub-combination of parts including a main driven plate having its hub arranged for irrevoluble connection to a driven clutch shaft leading to the transmission gearing, said plate also being provided with rearward extensions, a pressure plate substantially at the rear of the sub-combination, a friction disk located between peripheral portions of the main and pressure plates and provided with peripheral conformations to cooperate with driving elements of the engine fly wheel, power multiplying releasing levers pivoted in said main plate extensions and arranged to engage against members of the pressure plate to release the clutch, a shifter adapted for mounting on said shaft and arranged to pass through an aperture of the pressure plate and connected to the power ends of the levers, and helical springs housed substantially within the limits of the main and pressure plates and connected to exert direct spring pressure to draw the plates together.

19. In a friction clutch adapted for location between the engine and transmission gearing of a vehicle adjacent to the engine fly wheel, a sub-combination of parts including a main driven plate having its hub arranged for irrevoluble connection to a driven clutch shaft leading to the transmission gearing, said plate also being provided with rearward extensions, a pressure plate forming substantially a rear housing for the sub-combination, driving friction disks located between peripheral portions of the main and pressure plates and provided with peripheral conformations to cooperate with driving elements located on the engine fly wheel, driven friction disks cooperating with the driving disks and having inner peripheral conformation engaging said main plate extensions, power multiplying releasing levers pivoted in said projections and substantially enclosed between the main plate and the pressure plate, the levers being arranged to engage against members of the pressure plate to release the clutch, a shifter adapted for mounting on said shaft and arranged to pass through an aperture of the pressure plate and connected to the power ends of the levers, and helical springs housed substantially within the limits of the main and pressure plates and connected to exert direct spring pressure to draw the plates together.

Signed at the city of New York, in the county of New York and State of New York, this 6th day of October A. D. 1920.

ARTHUR B. BROWNE.